United States Patent [19]
Mott et al.

[11] 4,000,646
[45] * Jan. 4, 1977

[54] WAVE HEIGHT MEASURING DEVICE

[75] Inventors: George Edward Mott; Robert Lee Skaggs, both of Metairie, La.

[73] Assignee: Texaco Inc., New York, N.Y.

[ * ] Notice: The portion of the term of this patent subsequent to Oct. 7, 1992, has been disclaimed.

[22] Filed: July 14, 1975

[21] Appl. No.: 595,454

Related U.S. Application Data

[63] Continuation of Ser. No. 248,995, May 1, 1972, Pat. No. 3,910,111.

[52] U.S. Cl. .......................................... 73/170 A
[51] Int. Cl.² ....................................... G01B 17/00
[58] Field of Search ............... 73/170 A, 504, 505, 73/67.7, 170 R, 290, 305, 306, 552; 340/3 R

[56] References Cited
UNITED STATES PATENTS

| | | | |
|---|---|---|---|
| 1,237,734 | 8/1917 | Wood | 73/505 X |
| 2,869,108 | 1/1959 | Smith | 73/170 AU X |
| 2,997,689 | 8/1961 | Johnson et al. | 73/170 A |
| 3,038,143 | 6/1962 | Dow | 73/170 A |
| 3,071,008 | 1/1963 | Steele | 73/504 |
| 3,083,578 | 4/1963 | Rosato et al. | 73/504 |
| 3,336,799 | 8/1967 | Kermode | 73/170 A |
| 3,397,574 | 8/1968 | Soulant | 73/170 A |
| 3,534,599 | 10/1970 | Hoehne | 73/170 A |

FOREIGN PATENTS OR APPLICATIONS

| | | | |
|---|---|---|---|
| 133,613 | 3/1960 | U.S.S.R. | 73/170 A |

OTHER PUBLICATIONS

Munskie, Undersea Technology, "Progress On Mohole" vol. 4, No. 12, pp. 16–18, Dec. 63.

*Primary Examiner*—Richard C. Queisser
*Assistant Examiner*—Stephen A. Kreitman
*Attorney, Agent, or Firm*—Thomas H. Whaley; Carl G. Ries; Robert B. Burns

[57] ABSTRACT

The invention relates to a wave measuring instrument for use on a dynamically positioned or tethered floating vessel whereby to continuously monitor wave height, wave period and vertical heave of the vessel as the vessel responds to waves, swell and currents. The instrument comprises a measuring device connected to the vessel hull in a substantially submerged position whereby to continuously record the distance between the instrument and the ocean floor as the vessel heaves. A second measuring means automatically gauges and records the normally varying distance between the instrument and the water's surface, which distance results from the usual presence of wave action whether the latter be gradually rolling or relatively turbulent.

The respective measurements thus obtained are thereafter integrated and compensated for to provide a relatively accurate record of the actual wave height between trough and crest, the wave period, and the vertical movement or heave of the vessel.

2 Claims, 6 Drawing Figures

U.S. Patent    Jan. 4, 1977    4,000,646
FIG. 1
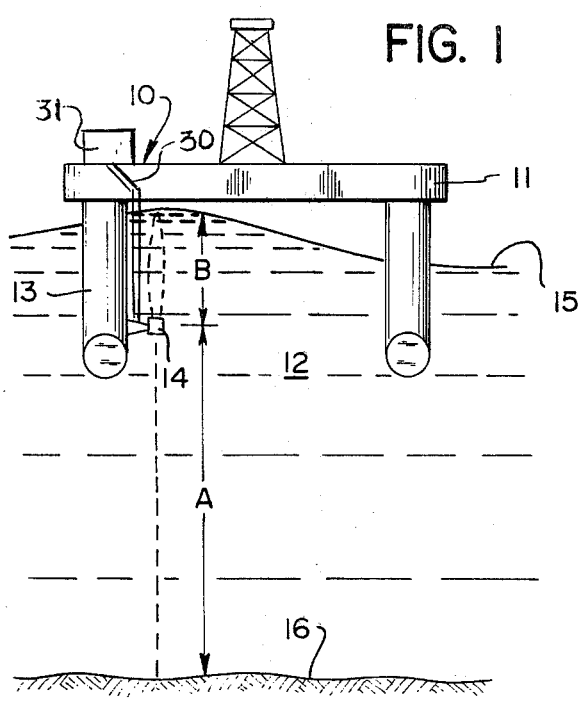
FIG. 2
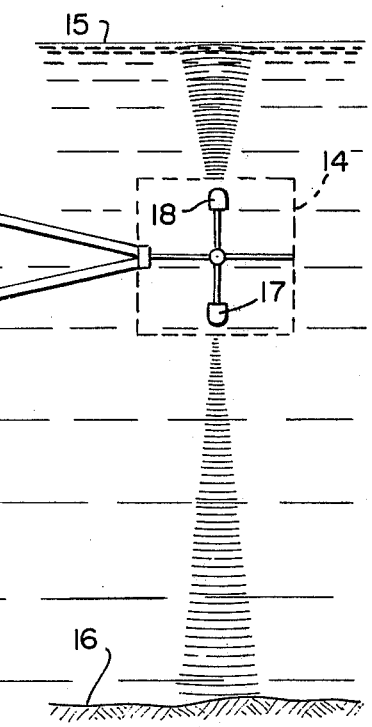
FIG. 4
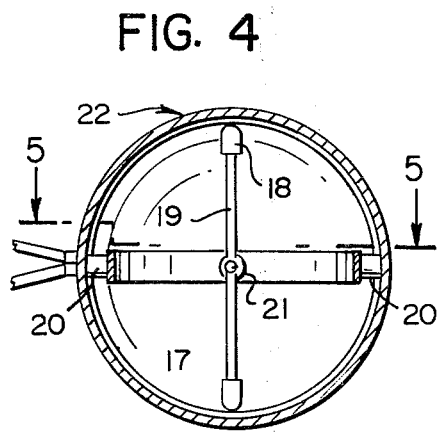
FIG. 5
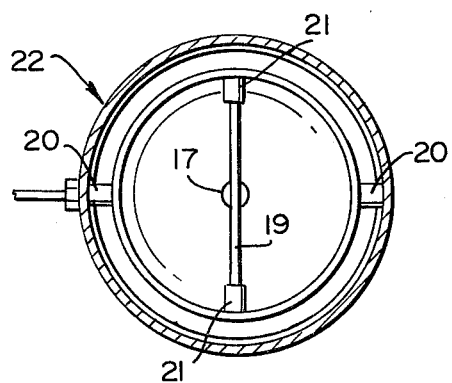
FIG. 6
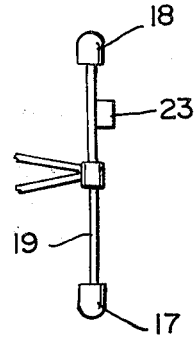
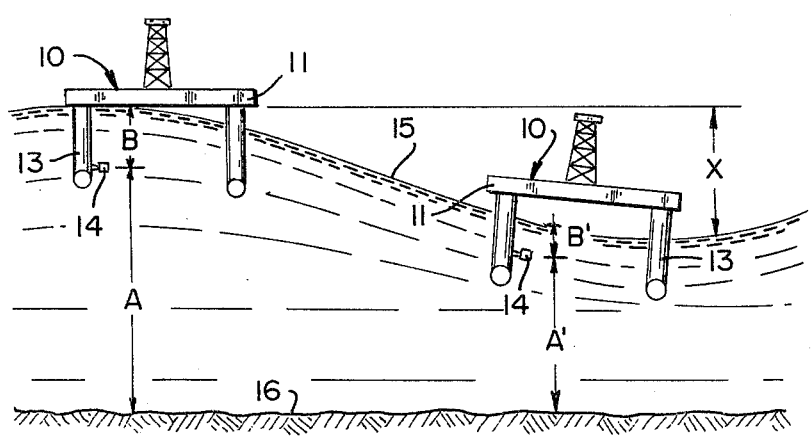
FIG. 3

WAVE HEIGHT MEASURING DEVICE

This is a continuation of application Ser. No. 248,995, filed May 1, 1972, now U.S. Pat. No. 3,910,111

BACKGROUND OF THE INVENTION

There presently exist a number of ways for determining the height and period of waves in an open stretch of water. Such measurements can be achieved most readily either through visual means, or through the use of appropriate electronic instrumentation. For accuracy however, such measuring devices must be positioned on a fixed structure which does not respond to the waves.

On the other hand, such instruments cannot be utilized on floating vessels as their effectiveness is contingent on the stability of the vessel and the condition of the seas thereabout. Where the seas are in a turbulent condition, the consequent vessel motion is relatively severe. The difficulty therefore of obtaining an accurate wave height and period measurement is compounded if not precluded.

In the instance of floating type mobile offshore drilling units adapted to drill submerged wells for gas, oil and other fluids, it is highly desirable to continuously monitor the condition of the open seas and the response of the unit to the sea conditions. Said monitoring is required to establish future design and operating conditions, and to determine when to shut down drilling operations and disconnect from the well, all of which bears upon the success of the operation and the safety of the personnel involved.

For example, in the drilling of any offshore well from a floating vessel, the latter is subject to continuous rolling, heaving and pitching motion as a result of wind, wave and swell action. It is economically desirable to maintain a continuous drilling operation. Thus, the drilling equipment must be adapted to adjust in response to such movement of the vessel and especially to the vertical heaving of the latter.

In this respect such vertical movement can be accommodated by the use of compensating equipment incorporated within the drill string to minimize the effect of the moving vessel on the drill bit. Howwever, it has become practical and even desirable to compensate for said heaving by the use of heave compensating equipment carried directly on the ship.

In the instance of the latter, the function of such compensating equipment is to in effect adjust the height of the travelling block as the ship rises and falls thereby maintaining a constant tension on the drill pipe. The actuating system in such an instance comprises normally a pressure source which can be actuated to rapidly raise or lower the said travelling block and maintain the relative position thereof as the vessel passes through its periodic undulations in response to wave action.

Therefore, to more effectively utilize the compensating mechanism, it is desirable to determine in advance the approximate wave pattern of the water as the ship rides thereon. With this pattern determined, the drill string compensating apparatus can be programmed or actuated in advance, whereby to anticipate movement of the vessel, and consequently adjust the latter at the correct timing and stroke length.

It is further desirable, and one of the objectives of the invention, to effectively regulate such actuating equipment, in response to the repeating wave pattern of the water. The latter is thus constantly calculated as a determinant for the programming of the actuating equipment.

In achieving the objects of the invention which is to provide a simplified, effective wave height and period measuring device and a heave measuring device, the latter includes a mounting means on a vessel for holding vertically aligned wave measuring instruments. Each instrument is operably mounted or positioned so as to be readily adjustable in response to both vertical heaving and rolling and pitching of the vessel. Thus, the actual measuring devices are maintained in a substantially constant vertical orientation and respond only to the vertical motions of the vessel.

DESCRIPTION OF THE DRAWINGS

FIG. 1 represents an elevation view of a semi-submersible drilling vessel adapted to operate in offshore waters for drilling subsea wells.

FIG. 2 is a segmentary view of a portion of the platform shown in FIG. 1.

FIG. 3 is a diagrammatic representation of a floating vessel whereon the present device is utilized.

FIG. 4 is a segmentary view on an enlarged scale of a wave measuring device of the type contemplated.

FIG. 5 is similar to FIG. 4.

FIG. 6 illustrates an alternate embodiment of the devices shown in FIGS. 4 and 5.

Referring to the drawings, FIG. 1 illustrates an embodiment of an offshore platform 10 of the type contemplated. The platform itself comprises a deck 11 which is normally positioned above the surface 15 of the body of water 12 by a controllably buoyant support or understructure 13. A measuring means or instrument package 14 is so mounted to a submerged portion of understructure 13 to monitor the water conditions and to record measurable data.

Referring to FIG. 2, instrument package 14 comprises in part, means 17 for generating a relatively low frequency sound wave which is directed downwardly toward the ocean floor 16. After being reflected from the latter, at least a portion of the sound wave is reflected upwardly through the water and received by a sound receiving device.

Similarly, a second sound wave is generated and directed vertically upwardly by a second sound generating means 18, toward the water's surface 15 where it will strike the air-water interface and a portion thereof being reflected downwardly to be received and recorded.

Said first signal source and transmitter 17 can comprise a standard form of electronic depth gauge or similar device. One embodiment of such an instrument includes a sonic signal generator and transmitter, commonly referred to as a transducer. Said instrument, at predetermined intervals of time, produces and receives a sound wave. The latter thus serves as both emitter for the downwardly directed wave, and as a receiver or collector for the returning portion of the echoed wave.

Operationally, the water depth through which the transmitted wave passes is determined as a function of the time elapsed between transmission and reception of the signal or wave. In any instance, the time of passage of the sound wave will provide an instantaneous determination of the depth of water beneath the floating platform.

Simultaneously with the depth measuring signal, the height of the water column immediately above instrument package 14 is determined. As noted, the latter can comprise a second sound generating and transmitting means 18, or it can assume the embodiment of a pressure sensitive instrument. While a barometric pressure responsive device is applicable to the instant member, there are a number of commercially available devices adapted to rapidly and accurately measure the height of a vertical water column above the device. The latter measured distance will serve to represent the distance between the water's surface and the instrument package at any particular instance during a wave period. Said member is thus necessarily rapidly responsive to pressure changes and variations. Such a requirement of responsiveness is essential since normally the platform will be subjected to not only continuous wave action, but also to long, gradual swells which tend to rise and fall in a set pattern.

The mounting means for stabilizing the under water instrument package in a vertical orientation can assume the arrangement shown in FIG. 4. The transducers 17 and 18 would be connected by a shaft 19 which is connected to gimbal axles 20 and 21. The gimbal supported transducers 17 and 18 would be enclosed inside a fluid filled sphere 22. The sphere 22 would shield the gimbal mounted transducers 17 and 18 from current forces that are generated by wave and current induced vessel motions. The shielding of the transducers 17 and 18 will allow all measurements to be made in a vertical plane as the vessel 10 rolls and pitches from wave and current action.

An alternate means of mounting the under water instrument package is shown in FIG. 5. The transducers 17 and 18 would be mounted in a fixed position. A roll and pitch indicator 23 to measure vessel motions from vertical would be mounted on the shaft 19 to which the transducers 17 and 18 are connected. The transducers 17 and 18 would measure inclined distances that would have to be corrected based on angularity introduced by roll and pitch of the vessel 10.

The true height of a wave is here represented by the distance X which denotes the distance between the crest and trough of a particular wave. By determining the respective distances A-B as well as A'-B', the overall difference in said figures will provide the desired X distance indicating the wave height.

The rapid integration of A plus B distances to find X, can of course be achieved mathematically as the respective distances A and B are determined for a particular point. However, preferably said figures represented by X can best be recorded automatically through a suitable double pen recorder which simultaneously records distances A and B one above the other and continuously fed sheet of recording paper.

Other modifications and variations of the invention as hereinbefore set forth may be made without departing from the spirit and scope thereof, and therefore, only such limitations should be imposed as are indicated in the appended claims.

We claim:

1. Method for measuring wave height in a body of water from a marine structure floatably positioned in said body of water and subjected to vertical heaving resulting from movement of said water, said method comprising the steps of:
    measuring a first distance between a reference point on said floating structure and the floor of said body of water,
    simultaneously measuring a second distance between said reference point to the interface of the water and the atmosphere above said reference point,
    repeating the above steps when said structure is at the crest and trough respectively of a wave to be measured,
    correlating the distances obtained when the structure is at the wave trough and crest whereby to determine the height of said wave and the period of time which elapses between successive wave height measurements whereby to establish the period of time which occurs between successive waves.

2. The combination with a marine structure adapted to be floatably positioned in an offshore body of water in which high waves and turbulent water conditions are prevalent, and which marine structure is free to be displaced vertically in response to the forces of wind and water acting thereagainst, of a wave height measuring device comprising:
    first measuring means depending from said structure, being disposed beneath the surface of said body of water and being actuatable to generate a first signal for gauging the vertical distance between said first measuring means and the floor of said body of water,
    second measuring means depending from said structure and disposed beneath the water's surface, said second measuring means being actuatable to generate a second signal to gauge the vertical distance between said second measuring means and said water's surface,
    means for integrating said respective first and second signals whereby to determine the varying height of said water's surface, and
    pitch indicator means cooperative with said respective first and second measuring means, and being operable to measure the degree of vertical displacement existing between said first and second measuring means in response to movement of said marine structure.

* * * * *